United States Patent
Jacobine et al.

(10) Patent No.: US 6,756,465 B1
(45) Date of Patent: Jun. 29, 2004

(54) MOISTURE CURABLE COMPOUNDS AND COMPOSITIONS

(75) Inventors: Anthony Francis Jacobine, Meriden, CT (US); Steven Thomas Nakos, Andover, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 179 days.

(21) Appl. No.: 09/981,965

(22) Filed: Oct. 19, 2001

(51) Int. Cl.$^7$ .................. C08G 77/18; C08G 75/02; C08G 69/02; C08G 63/02; C08G 18/02
(52) U.S. Cl. ................... 528/29; 528/38; 528/28; 106/287.11; 556/414; 525/440; 525/453; 525/419; 568/679
(58) Field of Search .................... 528/29, 38, 28; 106/287.11; 556/414; 525/440, 453, 419; 568/679

(56) References Cited

U.S. PATENT DOCUMENTS

| 5,432,246 A | 7/1995 | Fenn et al. ............... 528/28 |
| 5,587,502 A | 12/1996 | Moren et al. ............ 556/420 |
| 5,744,528 A | 4/1998 | Callinan et al. .......... 524/265 |
| 5,760,123 A | * 6/1998 | Vogt-Birnbrich et al. |
| 6,057,001 A | 5/2000 | Schoonderwoerd et al. ..... 427/385.5 |

FOREIGN PATENT DOCUMENTS

| EP | A-0 267 698 | 6/1993 | ........... C08L/33/06 |
| JP | 60-44549 | * 3/1985 | |
| JP | 60-4459 | 7/1994 | |

* cited by examiner

*Primary Examiner*—Kuo-Liang Peng
(74) *Attorney, Agent, or Firm*—Steven C. Bauman

(57) ABSTRACT

A moisture curable compound for bonding substrates and a moisture curable adhesive composition are provided. The adhesive composition includes an alkoxysilane functional urethane compound having hydrolyzable alkoxysilane groups anchored on a flexible backbone. Also provided are processes for the preparation of the moisture curable compounds and a method of using them as moisture curable adhesives for bonding substrates to produce bonded composites.

17 Claims, No Drawings

MOISTURE CURABLE COMPOUNDS AND COMPOSITIONS

BACKGROUND OF THE INVENTION

1. Field of the Invention

The present invention relates to moisture curable compounds, which can be used in moisture curable adhesive compositions. More particularly, the present invention relates to moisture curable compounds, which can cure through alkoxysilane groups to form high strength bonded articles.

2. Brief Description of Related Technology

U.S. Pat. No. 6,057,001 describes a coating composition having a polyacetoacetate and a crosslinker. The coating composition may also have an organosilane. Although the composition has improved substrate-adhesion and is particularly useful as a primer for an aluminum substrate, it is not a moisture curable composition.

U.S. Pat. No. 5,744,528 describes a water-curable resin composition composed of a water-reactive alkoxysilane terminated resin having at least one hydrolyzable group per molecule. The composition is used to prepare an orthopedic cast. While the alkoxysilane terminated resin is moisture curable, the composition employs materials such as the primer and biuret adducts of tetramethylxylene diisocyanate (TMXDI).

U.S. Pat. No. 5,587,502 describes hydroxy functional alkoxysilane and alkoxysilane functional polyurethane made therefrom. The alkoxysilane functional polyurethanes prepared from a hydroxy functional alkoxysilanes, such as, hydroxycarbamoylsilane, can be derived from TMXDI and are moisture curable. The alkoxysilane functional polyurethanes may be used moisture-curable adhesives and sealants.

U.S. Pat. No. 5,432,246 describes a silane functional oligomer suitable for use in the formulation of clear coating compositions. The oligomer has at least one hydrolyzable silane group and is the reaction product of: (i) a silane coupling agent having a hydrolyzable silane group and a secondary amine group, (ii) a polyisocyanate having more than one tertiary isocyanate group and other optional components. The polyisocyanate can be a TMXDI/TMP adduct, which is the reaction product of tetramethylxylene diisocyanate and trimethylolpropane.

European Patent Application No. EP-A-0 267 698 discloses a coating composition suitable for automobile refinish which includes an oligomer having hydrolyzable silane groups and a polymer having hydrolyzable silane groups. The oligomer is made by first reacting a hydroxyalkyl acrylate with a polyisocyanate to produce an intermediate having terminal unsaturated groups followed by reaction of this intermediate with an aminosilane. These compositions suffer from the problem that the water resistance of coatings produced from them is not entirely satisfactory, possibly due to the presence of amine groups in the oligomer.

Japanese Patent application No. JP 60-44549 discloses coating compositions including a silane functional urethane polymer and a silane functional vinyl resin. The silane functional urethane polymer is made by reacting an isocyanate functional urethane prepolymer with a silane coupling agent such as an aminosilane. A problem with this compo sition is that when the level of urea groups in the oligomer is high, the films formed from them become very hard and brittle and exhibit poor flexibility, which is a significant disadvantage, particularly in adhesive applications.

Not withstanding the state of the technology, it would be desirable to provide a moisture curable adhesive composition having an alkoxysilane terminated urethane based on polyethers or ester groups containing A-B-A block copolymers. Accordingly, the present invention provides such moisture curable adhesive compositions having long shelf life and excellent adhesion on substrates.

These and other aspects of the present invention will become apparent from the following description.

SUMMARY OF THE INVENTION

The present invention provides a moisture curable compound represented by the formula:

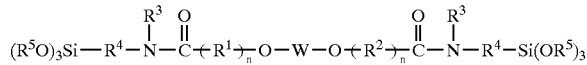

wherein W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and a combination thereof;

wherein $R^1$ is a group represented by the formula:

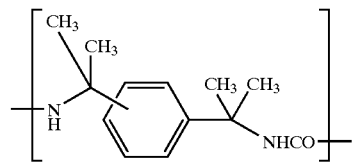

$R^2$ is a group represented by the formula:

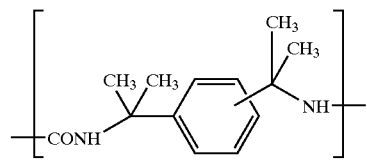

$R^3$ is selected from the group consisting of: hydrogen and hydrocarbyl group of 1 to 6 carbon atoms;

$R^4$ is a hydrocarbylene group of 1 to 4 carbon atoms;

each $R^5$ is independently a hydrocarbyl group of 1 to 6 carbon atoms; and n is zero or 1; with the proviso that when n is zero, $R^3$ is hydrogen.

In one aspect, the present invention provides a moisture curable compound represented by the formula:

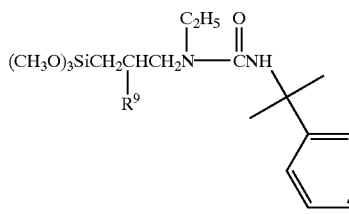 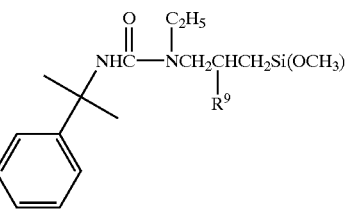

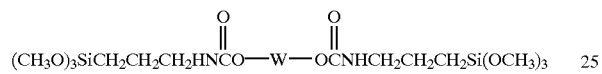

wherein each $R^9$ is independently selected from the group consisting of: hydrogen and methyl; and W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and a mixture thereof.

In another aspect, the present invention provides a moisture curable compound represented by the formula:

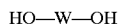

$(CH_3O)_3SiCH_2CH_2CH_2HNCO\text{—}W\text{—}OCNHCH_2CH_2CH_2Si(OCH_3)_3$ wherein W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and a mixture thereof.

The present invention further provides processes for preparing the moisture curable compounds of the invention.

In the first of these processes, there is provided a process for preparing a moisture curable compound represented by the formula:

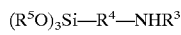

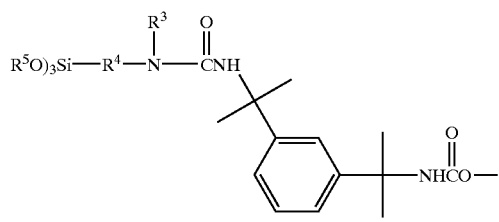

The process includes:

contacting at least two equivalents of α,α,α',α'-tetramethylxylylene diisocyanate represented by the formula:

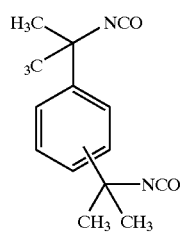

and a difunctional hydroxy compound represented by the formula:

HO—W—OH at a temperature and length of time sufficient to produce a 2:1 α,α,α',α'-tetramethyl xylylene diisocyanate: difunctional hydroxy compound adduct; and contacting the 2:1 α,α,α',α'-tetramethyl xylylene diisocyanate: difunctional hydroxy compound adduct and an aminosilane represented by the formula:

$(R^5O)_3Si\text{—}R^4\text{—}NHR^3$ at a temperature and length of time sufficient to produce the moisture curable compound;

wherein W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and a combination thereof;

$R^3$ is selected from the group consisting of: hydrogen and hydrocarbyl group of 1 to 6 carbon atoms;

$R^4$ is a hydrocarbylene group of 1 to 4 carbon atoms; and each $R^5$ is independently a hydrocarbyl group of 1 to 6 carbon atoms.

In the second of these processes, there is provided a process for preparing a moisture curable compound represented by the formula:

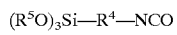

$(R^5O)_3Si\text{—}R^4\text{—}NH\text{—}C\text{—}O\text{—}W\text{—}O\text{—}C\text{—}NH\text{—}R^4\text{—}Si(OR^5)_3$ The process includes the steps of:

contacting at least two equivalents of an isocyanatosilane represented by the formula:

$(R^5O)_3Si\text{—}R^4\text{—}NCO$ and a difunctional hydroxy compound represented by the formula:

HO—W—OH

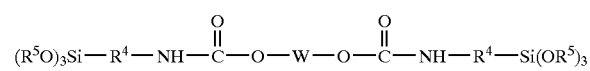
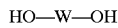

at a temperature and length of time sufficient to produce the moisture curable compound;

wherein W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and a mixture thereof;

$R^4$ is a hydrocarbylene group of 1 to 4 carbon atoms; and each $R^5$ is independently a hydrocarbyl group of 1 to 6 carbon atoms.

The present invention further provides a method of producing a bonded composite. The method includes the steps of:

applying onto at least one substrate an adhesive composition including a moisture curable compound according to the present invention to produce a coated surface on at least one substrate;

contacting the coated surface of one substrate and a coated or uncoated surface of another substrate; and exposing the adhesive composition including the moisture curable compound to moisture at a temperature and for a length of time sufficient to produce the bonded composite.

Adhesive compositions containing the moisture curable compounds of the present invention provide stable compositions that have long shelf life and excellent adhesion on substrates, including metal substrates, such as, stainless steel, steel, zinc, copper and the like. These and other aspects of the present invention will become apparent from the following description.

DETAILED DESCRIPTION OF THE INVENTION

As mentioned above, the present invention includes a moisture curable adhesive for bonding substrates, which includes a moisture curable compound represented by the formula:

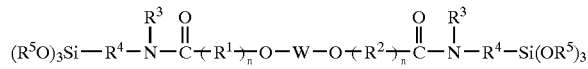

wherein W is a difunctional group, such as, a hydrocarbylene of 2 to 22 carbon atoms, an ether containing group, a thioether containing group, an ester containing group, a thioester containing group, an amide containing group, a thioamide containing group, a urea containing group, a urethane containing group, or a combination thereof. Preferably, W is a group, such as, $-CH_2(CH_2)_m-$, $-(CHR^6CH_2)_m-$, $-(CR^7R^8CH_2)_m-$ or a combination thereof, wherein $R^6$ is a hydrocarbyl group of 1 to 2 carbon atoms, each of $R^7$ and $R^8$ is independently hydrogen or a hydrocarbyl group of 1 to 2 carbon atoms; and m is from 1 to 22.

$R^1$ and $R^2$ groups are represented, respectively, by the formulae:

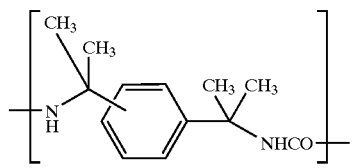

and

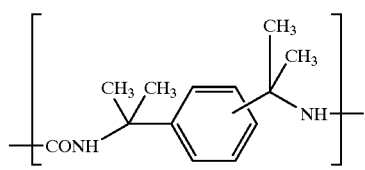

While $R^1$ and $R^2$ groups are identical, they differ only with respect to the point of attachment of the tertiary amino and tertiary amidocarbonyl groups to the remaining groups in the moisture curable compound of the present invention. The substitution pattern of the aromatic ring in $R^1$ and $R^2$ is meta-.

$R^3$ can be hydrogen or hydrocarbyl group of 1 to 6 carbon atoms. More preferably, $R^3$ is hydrogen or ethyl.

Preferably, $R^4$ is a hydrocarbylene group of 1 to 4 carbon atoms. More preferably, $R^4$ is 2-methyl-1,3-propylene or propylene.

Each $R^5$ is independently a hydrocarbyl group of 1 to 6 carbon atoms and n is zero or 1 with the proviso that when n is zero, $R^3$ is hydrogen. Preferably, $R^5$ is methyl.

Preferably, the ether containing group is a polyether group, such as, $-(CH_2CH_2O)_m-CH_2CH_2-$, $-(CHR^6CH_2O)_m-CHR^6CH_2-$, $-(CH_2CH_2CH_2O)_m-CH_2CH_2CH_2-$, $-(CH_2CH_2CH_2CH_2O)_m-CH_2CH_2CH_2CH_2-$ or a combination thereof, wherein $R^6$ is a hydrocarbyl group of 1 to 2 carbon atoms and m is from 1 to 22. Examples of such polyether groups include poly (ethylene oxide), poly(propylene oxide), poly (tetramethylene oxide) and a combination thereof. Preferably, the polyether group has a molecular weight from about 500 to about 4000.

Preferably, the ester containing group can be selected from $-CH_2(CH_2)_m-COO-CH_2(CH_2)_m-$, $-[CH_2(CH_2)_m-COO-CH_2(CH_2)_m]_k-$ or a combination thereof, wherein each m and k independently is from 1 to 25. Preferably, the ester containing group is derived from an A-B-A block copolymer represented by the formula:

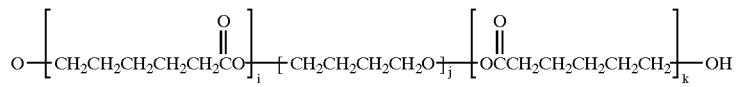

wherein each i, j and k is independently from about 1 to about 25. Preferably, the block copolymer has a molecular weight from about 500 to about 4000. An example of such an A-B-A block copolymer is CAPA 720 resin.

In a preferred embodiment, the moisture curable compound can be represented by the following formula:

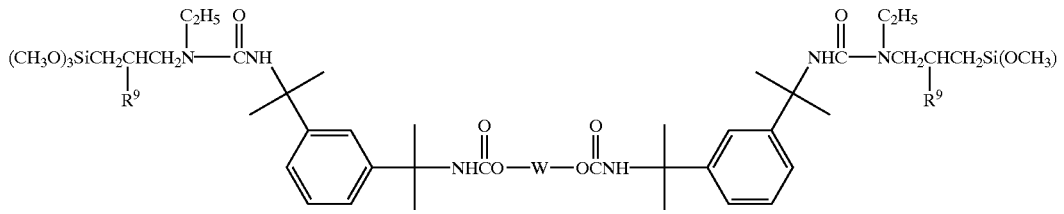

wherein W has the same meaning as above and each $R^9$ is hydrogen or methyl.

A particularly preferred moisture curable compound includes classes of compounds represented by the formulae:

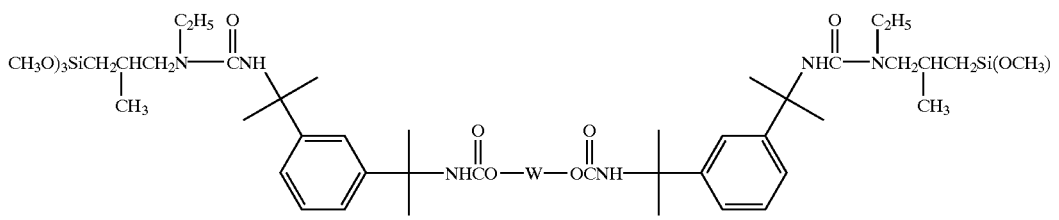

or

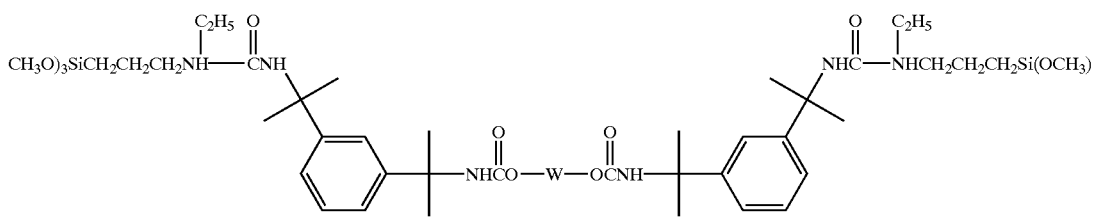

wherein W has the same meaning as above.

In another preferred embodiment, the moisture curable compound can be represented by the following formula:

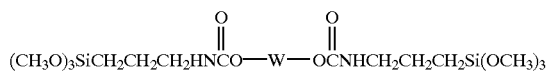

wherein W is a difunctional group, such as, a hydrocarbylene of 2 to 22 carbon atoms, an ether containing group, a thioether containing group, an ester containing group, a thioester containing group, an amide containing group, a thioamide containing group, a urea containing group, a urethane containing group, or a mixture thereof. The ether containing group can be a group, such as, $-(CH_2CH_2O)_m-$, $-CH_2CH_2-$, $-(CHR^6CH_2O)_m-CHR^6CH_2-$, $-(CH_2CH_2CH_2O)_m-CH_2CH_2CH_2-$, $-(CH_2CH_2CH_2CH_2O)_m-CH_2CH_2CH_2CH_2-$ or a combination thereof, wherein $R^6$ is a hydrocarbyl group of 1 to 2 carbon atoms and m is from 1 to 22. Preferably, the ether containing group is derived from a polyether, such as, poly(ethylene oxide), poly(propylene oxide), poly (tetramethylene oxide), or a combination thereof, and has a molecular weight from about 500 to about 4000.

As mentioned above, the present invention also provides processes for preparing the moisture curable compounds of the invention.

In the first of these processes, the moisture curable compound is represented by the formula:

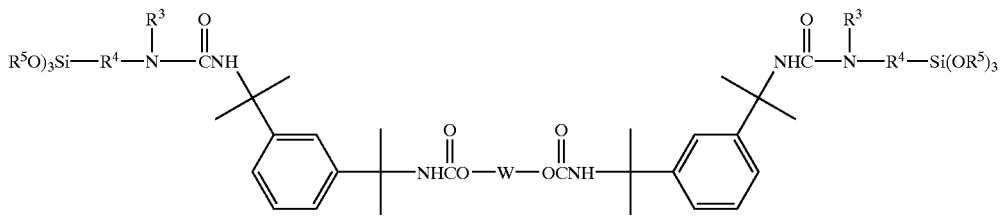

The process includes contacting at least two equivalents of α,α,α',α'-tetramethylxylylene diisocyanate represented by the formula:

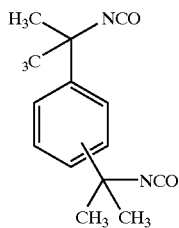

and a difunctional hydroxy compound represented by the formula:

HO—W—OH at a temperature and length of time sufficient to produce a 2:1 α,α,α',α'-tetramethyl xylylene diisocyanate: difunctional hydroxy compound adduct; and contacting the adduct and an aminosilane represented by the formula:

$(R^5O)_3Si$—$R^4$—$NHR^3$ at a temperature and length of time sufficient to produce the moisture curable compound. In these compounds W is preferably a difunctional group, such as, a hydrocarbylene of 2 to 22 carbon atoms, an ether containing group, a thioether containing group, an ester containing group, a thioester containing group, an amide containing group, a thioamide containing group, a urea containing group, a urethane containing group, or a combination thereof; $R^3$ is hydrogen and hydrocarbyl group of 1 to 6 carbon atoms; $R^4$ is a hydrocarbylene group of 1 to 4 carbon atoms; and each $R^5$ is independently a hydrocarbyl group of 1 to 6 carbon atoms. More preferably, $R^3$ is ethyl, $R^4$ is 2-methyl-1,3-propylene or 1,3-propylene and $R^5$ is methyl.

The moisture curable compound prepared by the first process of the present invention can be represented by the formula:

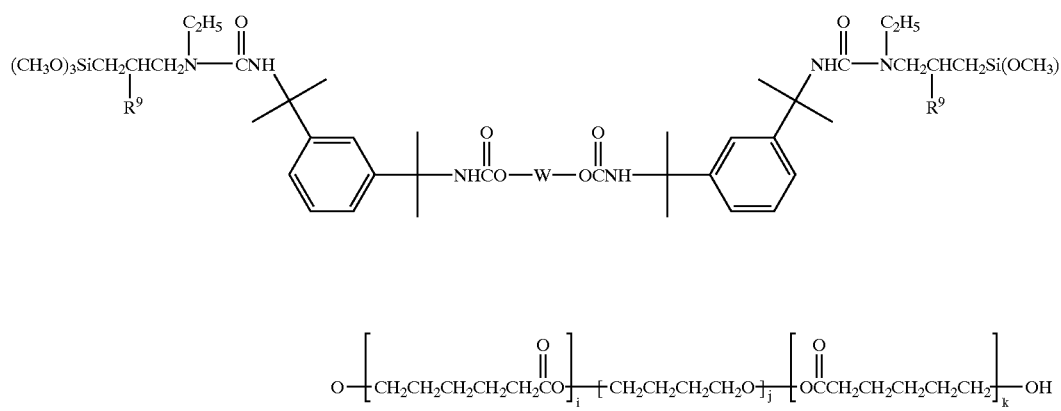

wherein W is an A-B-A block copolymer group represented by the formula:
wherein each i, j and k is independently from about 1 to about 25.

This process can be used to prepare classes of moisture curable compounds represented by the formulae:

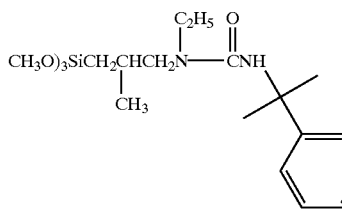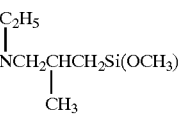

or

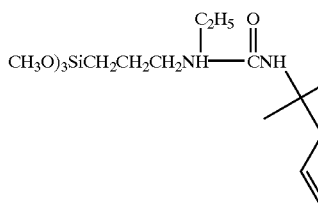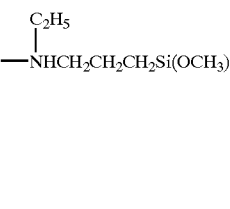

wherein W has the same meaning as above.

An example of the moisture curable compound according to the present invention prepared by the first process is illustrated by the following general synthetic scheme, wherein W has the same meaning as above:

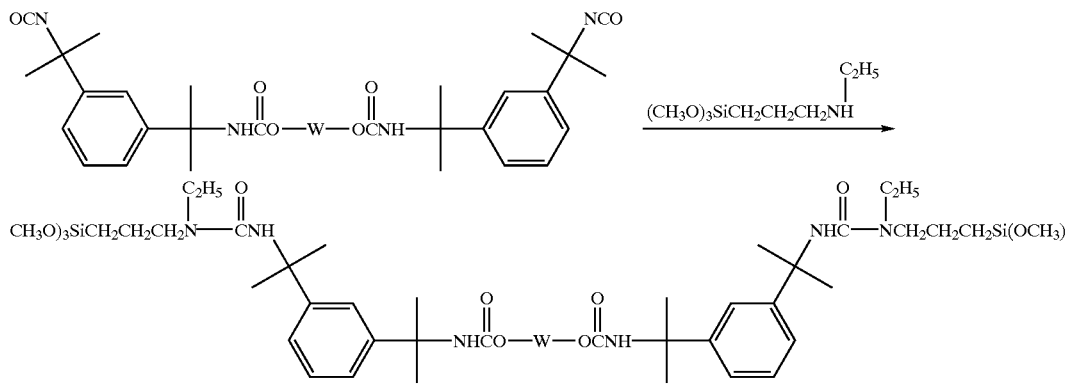

Preferably, the isocyanate reactive compounds have two isocyanate reactive functional groups, such as, hydroxy groups, and include simple diols of 2 to 22 carbon atoms, diols derived from an ester containing group, such as, polyesters diols and hydroxy terminated A-B-A block copolymer diols, and diols derived from an ether containing group, such as, polyether polyols and various combinations thereof.

Other suitable diols that can be used advantageously, either alone or in combination with the above diols, include linear, branched or cyclic alkylene diols, including alkylene diols that include an arylene group as a substituent or an arylene group in the chain, polycaprolactone diols, other polyester diols and polytetrahydrofurfuryl diols. Suitable diols include, in particular, linear or branched dihydric alcohols containing 2 to 22 carbon atoms, such as, ethylene glycol, propane-1,2-diol, propane-1,3-diol, butane-1,2-, 1,3- or 1,4-diol, pentane-1,5-diol, 2-methylbutane-1,4-diol, 2,2-dimethylpropane-1,3-diol, hexane-1,2- or -1,6-diol, decane-1,10-diol, hydrogenated bis-phenol-A, and a combination thereof.

The molecular weight of the isocyanate reactive compound having at least two isocyanate reactive functional groups is in the range from about 50 to about 10,000, preferably from about 50 to about 4,000.

The isocyanate may be any diisocyanate, including the diisocyanates described herein below. Preferably, the diisocyanate reactant is m- or p-α,α,α',α'-tetramethylxylylene diisocyanate, either alone, or in combination with another aliphatic or aromatic diisocyanate.

When a combination of m-α,α,α',α'-tetramethylxylylene diisocyanate and another aliphatic or aromatic diisocyanate is used, the other aliphatic or aromatic diisocyanate can be one or more of any suitable aromatic or aliphatic diisocyanate. Examples of such diisocyanates include 2,4-toluene diisocyanate, 2,6-toluene diisocyanate, 4,4'-diphenyl methane diisocyanate (MDI), 4,4'-dicyclohexyl diisocyanate, 3-isocyanatomethyl-3,5,5-trimethyl cyclohexyl isocyanate (isophorone diisocyanate), hexamethylene diisocyanate, 1,5-naphthylene diisocyanate, dianisidine diisocyanate, di-(2-isocyanatoethyl)-bicyclo[2.2.1]hept-5-ene-2,3-dicarboxylate, 2,2,4- and 2,4,4-trimethylene hexamethylene diisocyanate and mixtures thereof.

Preferably, the diisocyanates that can be used in combination with m- or p-α,α,α',α'-tetramethylxylylene diisocyanate include isophorone diisocyanate, methylene-bisphenyl diisocyanate, toluene diisocyanate, hexamethylene diisocyanate and mixtures thereof.

m-α,α,α',α'-Tetramethylxylylene diisocyanate (TMXDI) is preferred due to the good weatherability of its products and its ability to form relatively low viscosity resins.

Examples of the moisture curable compounds of this embodiment can be prepared by first reacting a difunctional hydroxy compound, such as, poly(tetramethylene oxide) or a hydroxyl-terminated A-B-A block copolymer of polycaprolactone (about 2000 molecular weight), with two moles of TMXDI to form an isocyanate-terminated prepolymer and thereafter, reacting the isocyanate-terminated prepolymer with 2 moles of, for example, N-ethyl-1-amino-2-methyl-prop-3-yltrimethoxysilane. In this case, the difunctional hydroxy compound preferably is a 2000 MW triblock copolymer of polycaprolactone-poly(tetramethylene ether)-polycaprolactone, commercially available as CAP A 720®, from Solvay-Interox.

The moisture curable compound prepared by the second process of the present invention can be represented by the formula:

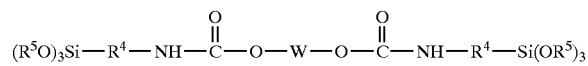

This process includes contacting at least two equivalents of an isocyanatosilane represented by the formula:

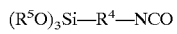

and a difunctional hydroxy compound represented by the formula:

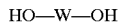

at a temperature and length of time sufficient to produce the moisture curable compound, wherein W is a difunctional group, such as, a hydrocarbylene of 2 to 22 carbon atoms, an ether containing group, an ester containing group, or a mixture thereof, $R^4$ is a hydrocarbylene group of 1 to 4 carbon atoms and each $R^5$ is independently a hydrocarbyl group of 1 to 6 carbon atoms.

This process utilizes the reaction of a difunctional hydroxy compound and an isocyanatoalkyl trialkoxysilane, such as, isocyanatopropyl trimethoxysilane, catalyzed by an organotin catalyst, such as, dibutyltin dilaurate, to produce a trialkoxysilane terminated moisture curable compound according to the present invention. For example, a difunctional hydroxy compound, such as, poly(tetramethylene oxide) can be reacted with, for example, isocyanatopropyltrimethoxysilane.

In the reaction of the difunctional hydroxy compounds with the trialkoxysilylalkylisocyanates, the difunctional hydroxy compound to trialkoxysilylalkylisocyanates molar ratio is preferably from about 1:2 to 1:2.2.

In each of the above cases, the product contains terminal trimethoxysilyl groups, which enable transition metal-catalyzed reaction with ambient moisture and subsequent silanol-methoxysilane crosslinking.

Preferably, the aminosilane is an N-alkyl-1-amino-2-methylprop-3-yl-trialkoxysilane, more preferably, N-ethyl-1-amino-2-methylprop-3-yl-trialkoxysilane (Witco A-Link 15®).

The N-alkyl substitution appears to be critical, because it minimizes the biuret formation, which is an undesirable side reaction resulting from the reaction of isocyanate and the urea groups formed as a result of the moisture cure. Such biuret formation from the reaction of isocyanates with urea groups can cause gellation of the reaction mixture.

The present invention also includes a moisture cure adhesive composition including the moisture curable compounds of the present invention and moisture, i.e., atmospheric or added moisture, or a combination thereof. These compositions may also contain additional additives known in the art to obtain desirable effects for the particular application envisaged. These additives include in particular dyes, inhibitors, viscosity controllers, emulsifiers that are capable of improving the compatibility of all the components, thickeners, plasticizers, diluents, thixotropy conferring agents and other additives typically used in the adhesives field may be added in the usual manner and quantities to achieve the required viscosity levels and other properties as desired.

Preferably, the viscosity of the adhesive composition is from about 1,000 cps to about 20,000 cps. However, in some cases, the moisture curable compounds of the present invention can be low viscosity and may slowly solidify at room temperature into an opaque wax. In such cases, the moisture curable compounds of the present invention are formulated and cured while they are still in a molten state.

Both reaction of the difunctional hydroxy compound with an isocyanate group and the subsequent moisture cure of the alkoxysilane terminated moisture curable compounds of the present invention can be catalyzed with a suitable catalyst. The cure catalysts include organometallic catalysts, bases and a combination thereof. The preferred cure catalysts include standard urethane catalyst, such as, organotin catalysts. Examples of such organotin catalysts include dibutyltindilaurate (DBTDL), tetrabutyldiacetoxystannoxane (TBDAS), dibutyltin acetylacetonate (ULA-45), dimethyltindilaurate and dimethyltindichloride. The catalysts are used to drive the reaction of the difunctional hydroxy compound and the diisocyanate to substantial completion and to improve the rate of the moisture cure. To improve the rate of the moisture cure, the use of dibutyltin acetylacetonate (UL-45) is preferred. The reaction of isocyanate and the aminosilane, i.e., A-Link 15, is autocatalytic.

The present invention provides a method of producing bonded composites. The method includes the steps of applying onto at least one substrate an adhesive composition including a moisture curable compound according to the present invention to produce a coated surface on at least one substrate, contacting the coated surface of one substrate and a coated or uncoated surface of another substrate; and exposing the adhesive composition including the moisture curable compound to moisture at a temperature and for a length of time sufficient to produce the bonded composite.

The adhesive composition of the present invention can be a one component or a two component composition.

Preferably, the adhesive is applied onto one or more substrates at ambient or sub-ambient temperatures to prevent premature initiation of the curing process. Thereafter, the adhesive is exposed to moisture to initiate the curing process.

The substrates are bonded by one of the following approaches:

(1) the coated surface of the first substrate and a surface of an uncoated second substrate are contacted;

(2) the coated surface of the first substrate and the coated surface of the second substrate are contacted; and (3) the coated surface of the first substrate and the non-coated surface of the second coated substrate are contacted.

In this latter case, the composite produced can be further bonded to a coated or uncoated surface of a third substrate, and the steps could be repeated using additional substrates, to produce a composite of three or more substrates, as the case may be.

The step of contacting the adhesive coated surface of one substrate and a coated or uncoated surface of the other substrate is preferably carried out at room temperature and for a period of from a few minutes to a few hours. Preferably, contacting is accompanied by application of sufficient pressure to reduce the gap between the substrates that are to be bonded.

The cured adhesive exhibits a high strength of adhesion to metal surfaces, such as steel, brass, copper and aluminum, irrespective of whether the metal surfaces are smooth or have merely been degreased with a solvent such as acetone, or chromate[d] or corundum-blasted.

The moisture curable compounds of the present invention can be used to produce bonded composites and moisture cured adhesive films and articles that can find use in a variety of applications.

The cured adhesive films and the bonded composites obtained by either of the above methods exhibit properties not achieved by the adhesive compositions of the prior art, including good weatherability and formation of relatively low viscosity resins.

The alkoxysilane functional urethane compounds having hydrolyzable alkoxysilane groups anchored on a flexible backbone are suitable for use in moisture curable adhesive compositions. Such adhesive compositions have a low toxicity and can be used to form cured films having properties required of adhesives, such as, a good balance of hardness and flexibility. Another advantage is an enhanced adhesion, particularly to plastics, due to the presence of polyester groups.

The adhesive compositions according to the present invention can be marketed in the form of one component system that can cure upon exposure to moisture.

The following examples are illustrative of the various embodiments of the present invention and should not be construed as being limiting.

EXAMPLE

Reaction of CAPA 720/m-TMXDI/N-ethyl-1-amino-2-methylprop-3-yl-trimethoxysilane

| Reagent | MW | Weight[a] | Equiv. | Ratio[b] |
|---|---|---|---|---|
| CAPA 720 | 2040.36 | 310.28 | 0.308 | 1.000 |
| TMXDI | 244.30 | 75.14 | 0.615 | 2.000 |
| N-Ethyl-1-amino-2-prop-3-yl-trimethoxysilane | 207.10 | 63.39 | 0.306 | 1.100 |
| Dibutyltin Dilaurate | | 0.39 | | |
| Vinyltrimethoxysilane | | 0.90 | | |
| Theoretical Yield (g): | | 450.1 | | |

[a]Weight in grams
[b]Equivalent Ratio

Procedure

CAP A 720 (melted beforehand at 60° C.), TMXDI, and dibutyltin dilaurate were introduced into a reaction flask at room temperature. The temperature was raised to about 75° C. After allowing for the exotherm run-up to 85° C. under dry air, the mixture was stirred for 2 hours at 75° C. The NCO content was determined by titration. Then, the N-ethylaminopropyltrimethoxysilane was added. An exotherm to 88° C. was observed. After stirring for 2 hours at 75° C., an IR trace showed that there was no NCO left. The vinyltrimethoxysilane was then added and stirred for 10 minutes (addition of small amounts of vinyltrimethoxysilane improves shelf stability by reacting with trace amounts of water present in these systems). The recovered Yield was 436.8 g.

Uncured Resin Observations

The uncured resin is flowable at R.T., transparent and is readily flowable when warm. It remained liquid after standing several days under ambient conditions.

Moisture-cured Resin Observations

To the above resin 0.3 wt % Witco UL45 (dibutyltin acetylacetonate) was added. After allowing the resin to cure in air, one side exposed, partial cure was observed after 24 hours. A tough film formed after 1 week.

Alternative work-up and isolation procedures are also possible, and will be evident to those skilled in the art.

The present invention has been described with particular reference to the preferred embodiments. It should be understood that the foregoing descriptions and examples are only illustrative of the invention. Various alternatives and modifications thereof can be devised by those skilled in the art without departing from the spirit and scope of the present invention. Accordingly, the present invention is intended to embrace all such alternatives, modifications, and variations that fall within the scope of the appended claims.

What is claimed is:

1. A moisture curable compound represented by the formula:

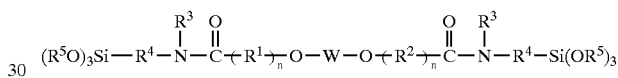

wherein W is an ester containing group, derived from an A-B-A block copolymer group represented by the formula:

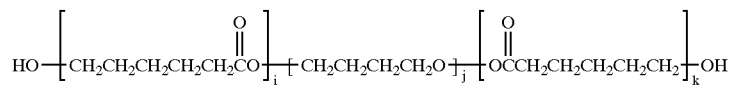

wherein each i, j and k is independently from about 1 to about 25;

$R^1$ is a group represented by the formula:

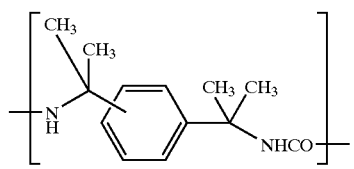

$R^2$ is a group represented by the formula:

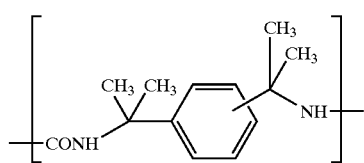

$R^3$ is selected from the group consisting of: hydrogen and hydrocarbyl group of 1 to 6 carbon atoms;

$R^4$ is a hydrocarbylene group of 1 to 4 carbon atoms;

each $R^5$ is independently a hydrocarbyl group of 1 to 6 carbon atoms; and n is zero or 1; with the provision that when n is zero, $R^3$ is hydrogen.

2. The moisture curable compound of claim 1, wherein said block copolymer has a molecular weight from about 500 to about 4000.

3. The moisture curable compound of claim 1, wherein $R^3$ is hydrogen.

4. The moisture curable compound of claim 1, wherein $R^3$ is ethyl.

5. The moisture curable compound of claim 1, wherein $R^4$ is 2-methyl-1,3-propylene or propylene.

6. The moisture curable compound of claim 1, wherein $R^5$ is methyl.

7. The moisture curable compound of claim 1, wherein the aromatic ring in $R^1$ and $R^2$ has a substitution pattern that is meta-.

8. The moisture curable compound of claim 1, wherein n is 1, and $R^3$ is selected from the group consisting of: hydrogen and ethyl.

9. A moisture curable compound represented by the formula:

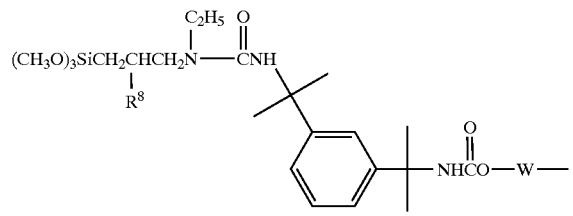

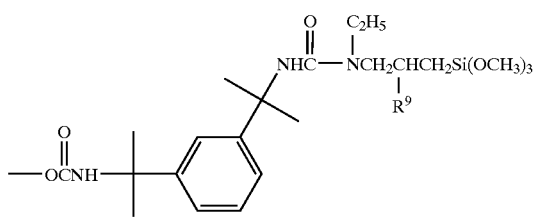

wherein each $R^9$ is independently selected from the group consisting of: hydrogen and methyl; and W is a difunctional group selected from the group consisting of: a hydrocarbylene of 2 to 22 carbon atoms, an ether containing group, a thioether containing group, an ester containing group, a thioester containing group, an amide containing group, a thioamide containing group, a urea containing group, a urethane containing group, and mixtures thereof.

10. The moisture curable compound of claim 9 represented by the formula:

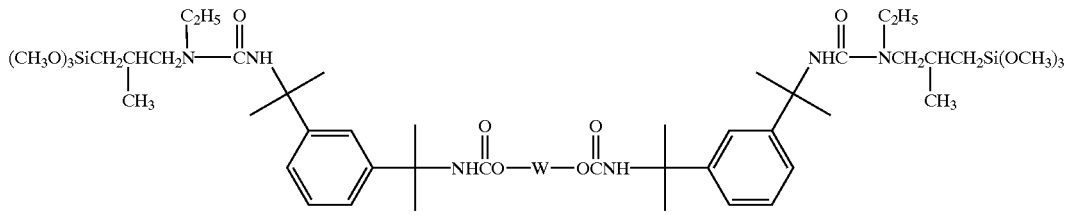

wherein W is a difunctional group selected from the group consisting of: a hydrocarbylene of 2 to 22 carbon atoms, an ether containing group, an ester containing group, and mixtures thereof.

11. The moisture curable compound of claim 10, wherein W is derived from an A-B-A block copolymer represented by the formula:

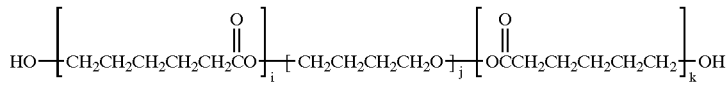

wherein each i, j and k is independently from about 1 to about 25.

12. The moisture curable compound of claim 11, wherein said A-B-A block copolymer has a molecular weight from about 500 to about 4000.

13. The moisture curable compound of claim 9 represented by the formula:

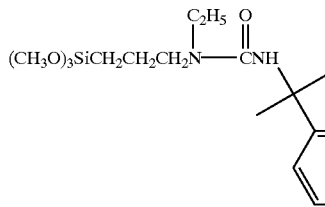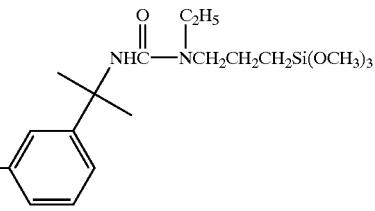

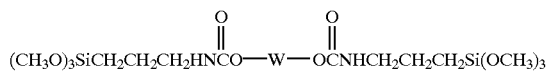

wherein W is a difunctional group selected from the group consisting of: a hydrocarbylene of 2 to 22 carbon atoms, an ether containing group, an ester containing group, and mixtures thereof.

14. A moisture curable compound represented by the formula:

$$(CH_3O)_3SiCH_2CH_2CH_2HNCO\text{—}W\text{—}OCNHCH_2CH_2CH_2Si(OCH_3)_3$$

wherein W is an ether containing group, selected from the group consisting of:
—(CH$_2$CH$_2$O)$_m$—CH$_2$CH$_2$—, —(CHR$^6$CH$_2$O)$_m$—CHR$^6$CH$_2$—, —(CH$_2$CH$_2$CH$_2$O)$_m$—CH$_2$CH$_2$CH$_2$—, —(CH$_2$CH$_2$CH$_2$CH$_2$O)$_m$—CH$_2$CH$_2$CH$_2$CH$_2$—, and combinations thereof; wherein R$^6$ is a hydrocarbyl group of 1 to 2 carbon atoms; and wherein m is from 1 to 22.

15. The moisture curable compound of claim 14, wherein said ether containing group is derived from a polyether selected from the group consisting of: poly(ethylene oxide), poly(propylene oxide), poly(tetramethylene oxide) and combinations thereof.

16. The moisture curable compound of claim 15, wherein said polyether has a molecular weight from about 500 to about 1584.

17. A moisture curable compound represented by the formula:

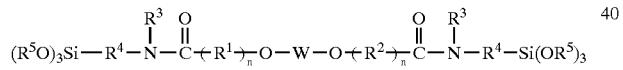

wherein W is a hydrocarbylene, selected from the group consisting of: —(CH$_2$CH$_2$)$_m$—, —(CHR$^6$CH$_2$)$_m$—, —(CR$^7$R$^8$CH$_2$)$_m$—, and combinations thereof;

wherein R$^1$ is a group represented by the formula:

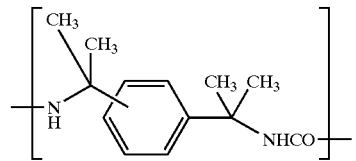

R$^2$ is a group represented by the formula:

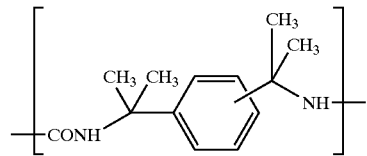

R$^3$ is selected from the group consisting of: hydrogen and hydrocarbyl group of 1 to 6 carbon atoms;

R$^4$ is a hydrocarbylene group of 1 to 4 carbon atoms;

each R$^5$ is independently a hydrocarbyl group of 1 to 6 carbon atoms; and n is zero or 1; with the proviso that when n is zero, R$^3$ is hydrogen; R$^6$ is a hydrocarbyl group of 1 to 2 carbon atoms; each of R$^7$ and R$^8$ is independently selected from the group consisting of: hydrogen and a hydrocarbyl group of 1 to 2 carbon atoms; and m is from 1 to 22.

* * * * *

UNITED STATES PATENT AND TRADEMARK OFFICE
CERTIFICATE OF CORRECTION

PATENT NO.    : 6,756,465 B1
DATED         : June 29, 2004
INVENTOR(S)   : Anthony F. Jacobine et al.

It is certified that error appears in the above-identified patent and that said Letters Patent is hereby corrected as shown below:

Column 3,
Line 56, replace the chemical structure with:

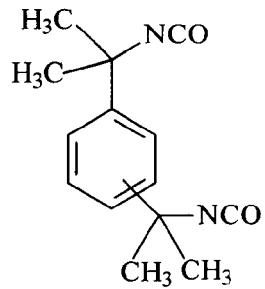

Column 9,
Line 1, replace the chemical structure with:

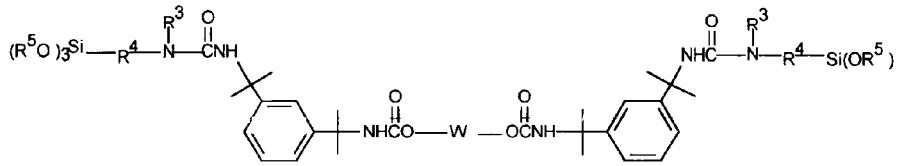

Line 17, replace the chemical structure with:

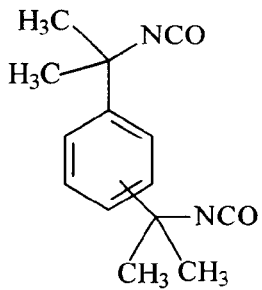

UNITED STATES PATENT AND TRADEMARK OFFICE
CERTIFICATE OF CORRECTION

PATENT NO.    : 6,756,465 B1
DATED         : June 29, 2004
INVENTOR(S)   : Anthony F. Jacobine et al.

It is certified that error appears in the above-identified patent and that said Letters Patent is hereby corrected as shown below:

Column 11,
Line 1, replace the chemical structure with:

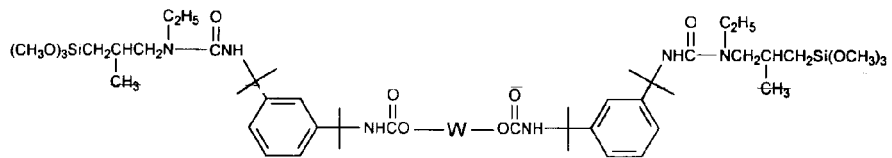

Line 15, replace the chemical structure with:

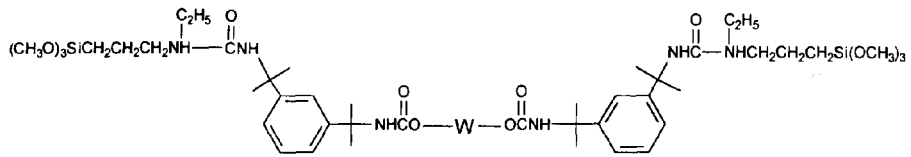

UNITED STATES PATENT AND TRADEMARK OFFICE
CERTIFICATE OF CORRECTION

PATENT NO. : 6,756,465 B1
DATED : June 29, 2004
INVENTOR(S) : Anthony F. Jacobine et al.

It is certified that error appears in the above-identified patent and that said Letters Patent is hereby corrected as shown below:

Column 11,
Line 30, replace the chemical reaction pathway with:

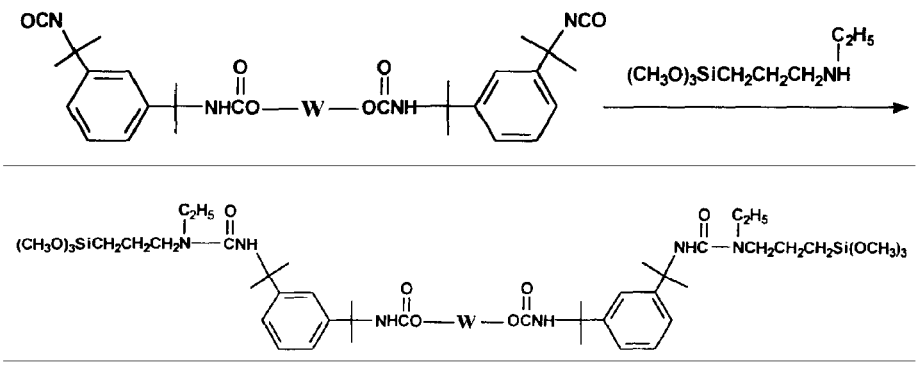

Signed and Sealed this

Twenty-eighth Day of September, 2004

JON W. DUDAS
*Director of the United States Patent and Trademark Office*